Fig. 1.

Dec. 22, 1931.  H. E. PRESTON  1,837,994
RECIPROCATING CONVEYER
Filed March 21, 1928    10 Sheets-Sheet 2

Inventor:-
Herbert E. Preston
by his Attorneys,
Howson & Howson Dec. 22, 1931.  H. E. PRESTON  1,837,994
RECIPROCATING CONVEYER
Filed March 21, 1928  10 Sheets-Sheet 3

Inventor:-
Herbert E. Preston,
by his Attorneys,
Howson & Howson

Dec. 22, 1931. H. E. PRESTON 1,837,994
RECIPROCATING CONVEYER
Filed March 21, 1928 10 Sheets-Sheet 4

Inventor:-
Herbert E. Preston,
by his Attorneys,
Howson & Howson

Dec. 22, 1931.                H. E. PRESTON                1,837,994
                         RECIPROCATING CONVEYER
                    Filed March 21, 1928       10 Sheets-Sheet 5

Inventor:-
Herbert E. Preston,
by his Attorneys,
Howson & Howson

Dec. 22, 1931.  H. E. PRESTON  1,837,994
RECIPROCATING CONVEYER
Filed March 21, 1928  10 Sheets-Sheet 6

Inventor:-
Herbert E. Preston,
by his Attorneys,
Howson Howson

Dec. 22, 1931.  H. E. PRESTON  1,837,994
RECIPROCATING CONVEYER
Filed March 21, 1928    10 Sheets-Sheet 7

Inventor:
Herbert E. Preston,
by his Attorneys,
Howson & Howson

Dec. 22, 1931.   H. E. PRESTON   1,837,994
RECIPROCATING CONVEYER
Filed March 21, 1928   10 Sheets-Sheet 8

Inventor:-
Herbert E. Preston,
by his Attorneys,
Howson & Howson

Dec. 22, 1931. H. E. PRESTON 1,837,994
RECIPROCATING CONVEYER
Filed March 21, 1928 10 Sheets-Sheet 9

Inventor:-
Herbert E. Preston,
by his Attorneys,
Howson & Howson

Patented Dec. 22, 1931

1,837,994

UNITED STATES PATENT OFFICE

HERBERT E. PRESTON, OF PHILADELPHIA, PENNSYLVANIA, ASSIGNOR TO AMERICAN ENGINEERING COMPANY, OF PHILADELPHIA, PENNSYLVANIA, A CORPORATION OF PENNSYLVANIA

RECIPROCATING CONVEYER

Application filed March 21, 1928. Serial No. 263,319.

My invention relates to conveyers, and it has for one object the provision of a conveyer which shall readily lend itself to the movement of fuel, grain, stone, gravel and the like.

Another object of my invention is to provide a conveyer which is characterized by its simplicity of design and its cheapness and ruggedness of construction.

A further object of my invention is to provide a conveyer with an arm, which is adapted to cause the material to be conveyed when moved in one direction only,—my invention further contemplating the forming of this arm in such manner that a scoop-like effect may be obtained during the working stroke tending to cause a movement of the conveyer in the direction of its supporting surface.

A still further object of my invention is to provide a conveyer, wherein the arms are disposed at an angle to each other, the degree of which depends upon whether it is desired to cause the material to be drawn toward the center of the conveyer or discharged from the sides thereof.

A still further object of my invention is to provide a drag bar, the cross-sectional area of which varies from either or both ends toward the center. Thus, by increasing the cross-sectional area from the free end of the drag bar, the dimensions thereof may be maintained at a minimum and yet the increased load on the drag bar due to each additional pusher arm may be properly taken care of and the necessary strength and ruggedness of construction essential for economical operation assured.

A still further object of my invention is to provide a conveyer, wherein the pusher or scraper arms are detachably secured to the drag bar, thus permitting the replacement of a broken pusher arm without the necessity for discarding the conveyer as a whole.

Other objects and applications, as well as details of construction and operation, whereby my invention may be practiced, will be apparent more fully hereinafter, when taken in connection with the accompanying drawings, wherein.

Figure 1:
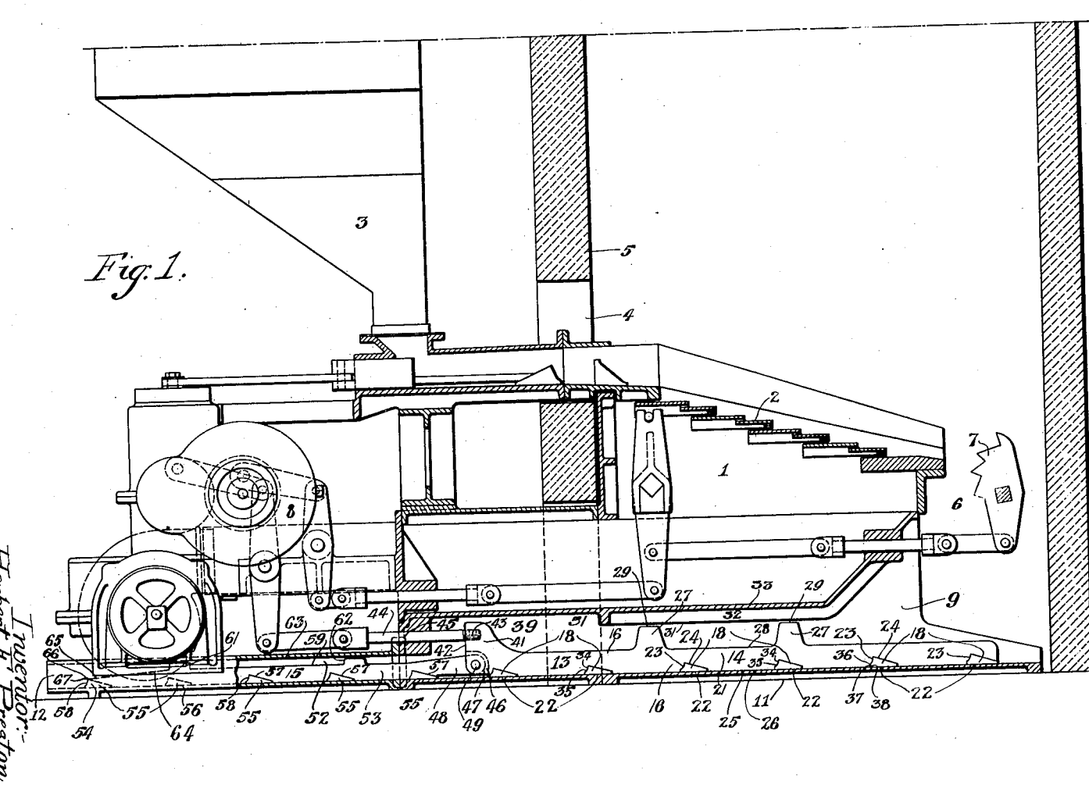
Fig. 1 is a side elevational view of a domestic type of stoker having a conveyer embodying my invention.

Referring to Figs. 1 to 5, inclusive, a domestic type of stoker 1 is illustrated as comprising a grate 2 over which fuel is fed from an externally positioned hopper 3 through an opening 4 in a furnace front wall 5. The grate 2 extends rearwardly to an ash pocket 6 which is provided with a crusher 7 operated by means of mechanism 8. The ash pocket 6 opens at its lower end into an ash duct or passage 9, which is extended outwardly of the stoker 1 just above a floor surface 11 through the furnace front wall 5. The passage 9 terminates in an opened end 12 positioned exteriorly of the stoker 1 and directly accessible. Attention is directed to the co-pending application Serial Number 317,-065, filed November 3, 1928, and assigned to the American Engineering Company, wherein certain portions of the structure of Fig. 1 are described and claimed in detail.

The present invention is directed to the provision of a drag or conveyer 13, whereby the ashes may be simply and efficiently removed from the ash pocket 6 and discharged from the outer end 12 of the chute passage 9 with a minimum expenditure of time and energy. While the conveyer constituting my invention is shown in connection with a furnace, it is also adaptable to the conveying of other materials, such, for example, as grain, stone, gravel and the like.

Considering the conveyer 13 in greater detail, as shown in Figs. 1 to 5, inclusive, the conveyer may comprise a plurality of cast parts or sections. For purposes of illustration, a main part 14 and an auxiliary part 15 only have been shown. The main part 14 comprises an elongated, centrally positioned drag bar 16 of triangular cross-section. The central supporting bar 16 is provided with a series of pairs 17 of pusher or scraper arms 18. The arms of each pair extend in opposite directions from oppositely inclined sides 19 and 21, respectively, of the central drag member 16, as shown, for example, in Figs. 2 and 4.

Figure 2:
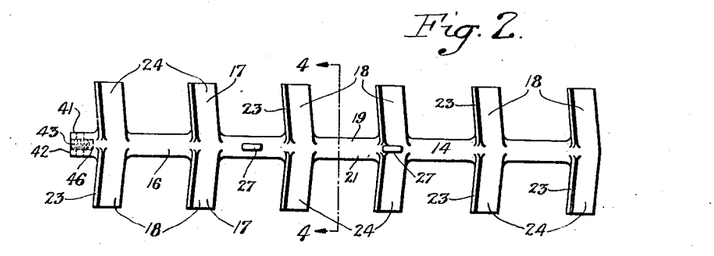
Figs. 2 and 3 are top-plan views of the main and auxiliary conveyer parts, respectively, of Fig. 1.
Figure 3:
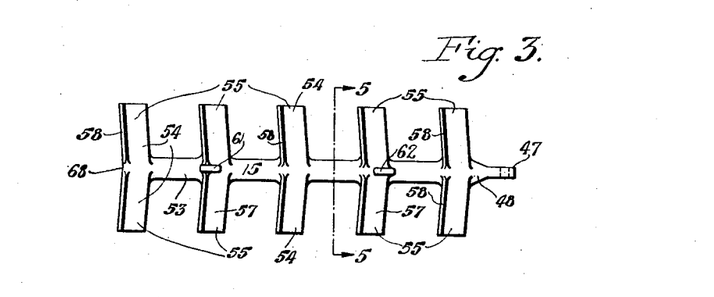
Figure 4:
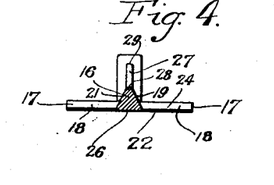
Figs. 4 and 5 are transverse sectional views taken on the lines 4—4 and 5—5 of Figs. 2 and 3, respectively.
Figure 5:
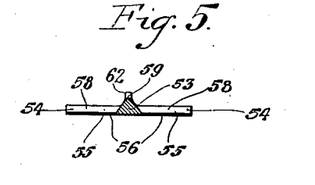

Each of the arms 18 is of wedge-like cross-section, comprising a lower side 22 and upper, material-engaging sides 23 and 24. The lower sides 22 of each pair of arms slidably engage an adjacent, lower side 25 of the chute 9 thereby affording a slidable support for the conveyer part 14 as a whole. A flat underside 26 of the central supporting bar 16 may also slidably engage the bottom side 25 of the passage 9. An upward movement of the conveyer side portions 22 and 26 out of engagement with the bottom 25 of the chute 9 is prevented by a plurality of spaced shoulders or bosses 27 which extend upwardly from an edge 28 formed by the inclined sides 19 and 21. Upper sides 29 of these bosses co-act with an underside 31 of an elongated rib 32 extending downwardly from a side 33 of the passage 9. Should the conveyer part 14 tend to raise, for reasons as will presently appear, movement is limited by reason of the engagement of the sides 29 of the bosses 27 with the elongated underside 31 of the rib 32.

Referring further to the wedge-like arms 18 extending from the central supporting member 16, the rear side 24 is beveled, so that when the conveyer 13 is moved inwardly of the stoker 1, the material in the passage 9 may pass over the arms 18 with relatively small retarding effect. The angle of the side 24 is, of course, a variable one, depending upon the material to be removed.

The front side 23 is so formed that when the conveyer 13 is actuated in a forward direction out of the structure 1, a scoop-like effect is exerted on the material, causing not only a forward bodily movement of material, but also an upward movement of that portion of material which is directly in engagement with the bottom 25 of the retort 9. As a result of this upward movement, a force is exerted on the arms 18, and hence on the conveyer 14 as a whole, tending to maintain the arms 18 as well as the elongated bar 16 in sliding engagement with the bottom 25 of the passage 9. This desired result is accomplished by providing the side 23 with upper and lower angularly disposed portions 34 and 35, respectively.

The upper portion of the front side wall 23 of each pusher or scraper arm 18 is substantially vertical, affording a material-abutting surface permitting a forward movement of the material when the conveyer 13 is moved outwardly of the stoker 1. The lower portion 35 is disposed at an angle to the part 34, as shown in Fig. 1, so that when the conveyer 13 is moved forwardly, a scoop-like effect is exerted on the material, particularly that on the bottom side 25 of the passage 9. The angled portion 23 may be substantially flat throughout its length or, as shown in Fig. 1, curved.

A lower edge 36 of the side portion 25 immediately adjacent to the bottom side 25 of the chute 9 is spaced therefrom by means of a relatively short vertical wall portion 37. The portion 37 is sufficiently small to permit the front side 23 and the bottom side 22 of the arm 18 to form a scraping edge 38, whereby material on the bottom side 25 of the chute 9 directly in the path of travel of the arms 18 may be lifted upwardly and prevented from passing under the arms 18. Thus, the material is not only moved forwardly, during the working stroke of the conveyer 13, but also upwardly from the bottom 25 of the passage 9, resulting in the sliding contact between the conveyer part 14 and the bottom 25 of the chute 9 being maintained.

As shown in Fig. 2, the arms 18 in each of the series of pairs 17 are disposed at an angle with respect to each other which is less than 180°. By thus angling the arms 18 of each pair, there is a tendency for the material to be drawn toward the center of the conveyer 13 during the working or forward stroke, thereby decreasing the frictional effect between the material being conveyed and opposite sides 39 of the passage 9. Should the conveyer part 14 be used in an application, wherein it is desirable to prevent this centering of the material but rather cause the material to be discharged from the sides of the conveyer, then the pusher or scraper arms 18 are connected to the central supporting bar 16 at an angle greater than 90°.

The central supporting bar 16 is provided with a forwardly and upwardly extending elongated head portion 41 which terminates in a front end face 42 provided with a threaded boring 43 for one end of a pusher rod 44. The rod 44 extends through an opening 45 in the housing 9 to the main operating mechanism 8. The front end face 42 is further provided with a recess 46 for the reception of an end portion 47 of a rearwardly extending tongue 48 from the auxiliary conveyer part 15. The connection between the tongue 48 and the head portion 41 is provided by means of a pin 49 which passes through the tongue 48 and is supported in the walls of the recess 46.

The auxiliary conveyer part 15 extends from an enlarged portion 51 of the passage 9 to a restricted portion 52 which terminates at the open end 12. In general, the auxiliary part 15 is similar to the main part 14, comprising a central drag bar 53 of triangular cross-section and a plurality of pairs 54 of arms 55. The arms 55 extend in opposite directions from the central drag bar 53 and may be disposed substantially at right angles thereto. Each of the arms 55 is of wedge-like cross-section, comprising an underside 56 which slidably engages the base portion 25 of the passage 9, a rear beveled side 57 and a front side 58. The sides 57 and 58 are formed similar to the sides 23 and 24 of the arms 18, whereby the material may be moved only when the conveyer 13 is actuated outwardly of the stoker 1. An upper edge 59 of the central supporting bar 53 is provided with a pair of bosses 61 and 62, which co-operate with an upper side 63 of the passage 9, whereby, should an upward movement of the conveyer part 15 occur, the extent of the movement may be limited to a safe value.

In accordance with my invention, a portion 64 of the central bar 53, forwardly of the front guiding boss 61, is tapered, so that an elongated inclined edge portion 65 thereof extends into a transverse edge portion 66 which is in substantial alignment with an upper edge 67 formed by the upper sides 57 and 58 of the oppositely extending pusher arms 55. An end portion 68 of the central bar 53 is provided with angularly disposed portions corresponding to those forming the front side 58. The end portion 68 is also in alignment with the sides 58 of the front pair of arms 54, so that in effect a continuous abutting surface is provided which extends across the full width of the conveyer. One advantage of thus tapering the bar 53 is that it permits a saving in material in that portion of the central bar 53 where the load is a minimum.

In operation, assuming the presence of ashes in the pocket 6 as well as in the passage 9, when the conveyer 13 is moved rearwardly into the stoker 1 by means of the pusher rod 44 and actuating mechanism 8, the material to be conveyed passes over the pusher arms 18, moving into the space between successive pairs 17 of the arms. When the pusher rod 44 moves in the opposite direction, causing the conveyer 13 to traverse its working stroke, the material to be conveyed is engaged by the front sides 23 and carried forwardly. At the same time, such material as is on the bottom 25 of the passage 9 is carried out of the path of the arms 18 by the scoop-like effect of the angled side portions 23. When the material is finally forced from the portion 51 of the passage 9 into the portion 52, a similar movement is imparted to the same by means of the conveyer arms 55. Finally, the material is discharged from the passage 9 through the outer end 12 where it may be collected in any convenient manner.

Referring to Figs. 6 to 11, inclusive, an alternative embodiment of my invention is shown, comprising a main conveyer part 69 and an auxiliary conveyer part 71. The main conveyer part 69 comprises an elongated, relatively thin central drag bar 72 of triangular cross-section and a series of pairs 73 of conveyer arms 74, the arms in each pair extending in opposite directions from the central supporting bar 72. The arms 74 are preferably disposed at an angle to the central bar 72, which is less than 90°, whereby the material being conveyed may be drawn toward the center of the conveyer part 69. Each of the arms 74 is of wedge shape cross-section comprising a bottom side 75, which is adapted to engage a supporting surface 76, and upper material-engaging sides 77 and 78. The side 78 is beveled to permit a movement of the material over the same during the return stroke of the conveyer. The front side 77 is substantially vertical, thereby differing from the side 23 of Fig. 1 with its angularly disposed portions 34 and 35.

Figures 6, 7, 8, 9, 10, 11:
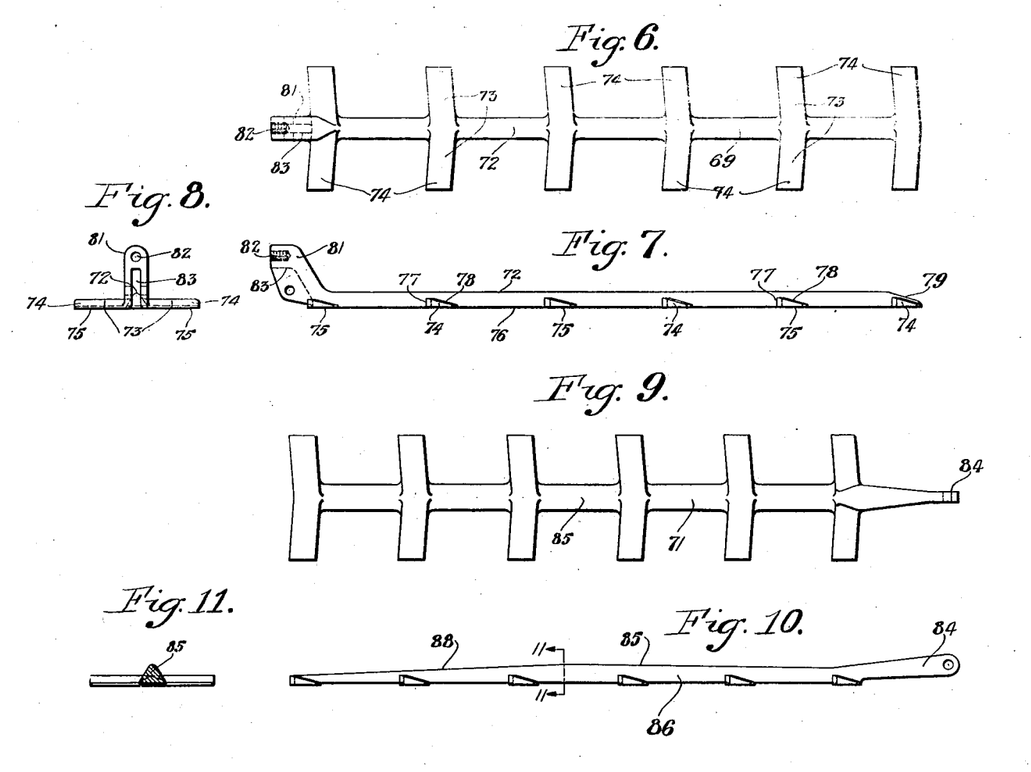
Figs. 6, 7 and 8 are top, side and end views, respectively, of an alternative embodiment of my invention, showing the main part of the conveyer.
Figs. 9, 10 and 11 are similar views of the auxiliary part of the conveyer.

A rear end portion 79 of the central drag bar 72 is beveled, as shown in Fig. 7, forming a shoulder which is raised above the adjacent beveled sides 78 of the rear pair of arms. An opposite or forward end 81 extends forwardly and upwardly from the supporting surface 76 for the conveyer, forming a head which is provided with a threaded portion 82 for a pusher rod (not shown) and also a recessed portion 83 for a tongue 84. The tongue 84 extends upwardly and rearwardly from a central drag-bar portion 85 of an auxiliary part 86 of the conveyer. A pin 87 serves to mount pivotally the tongue 84 in the recess 83. The central drag bar 85 of the auxiliary part 86, which is of triangular cross-section, is provided with an elongated tapered portion 88, the dimensions of which are a minimum adjacent to the front pair of cross arms. The further construction and operation of the conveyer is substantially the same as that set forth in connection with the discussion of the conveyer 13 of Figs. 1 to 5, inclusive.

Figures 12, 13:
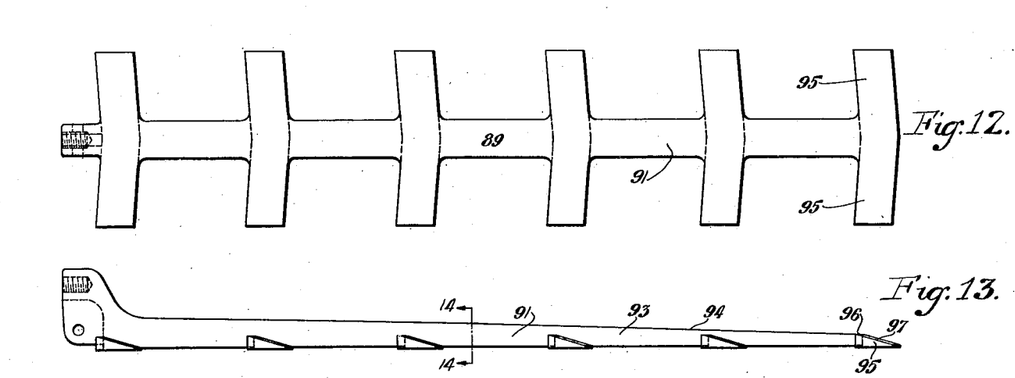
Figs. 12 to 17, inclusive, illustrate another form of embodiment of my invention, Figs. 14 and 17 being transverse sectional views taken on the lines 14—14 of Fig. 12 and 17—17 of Fig. 15, respectively.
Figure 14:
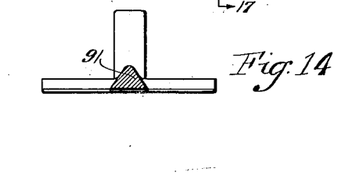
Figure 15:
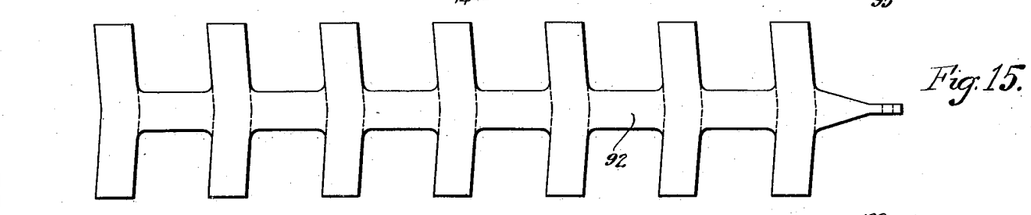
Figure 16:
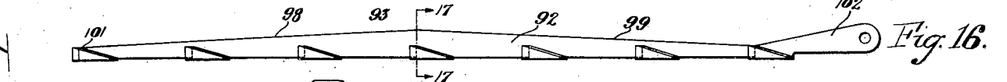
Figure 17:
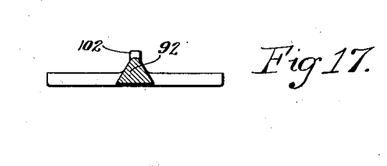
Figure 18:
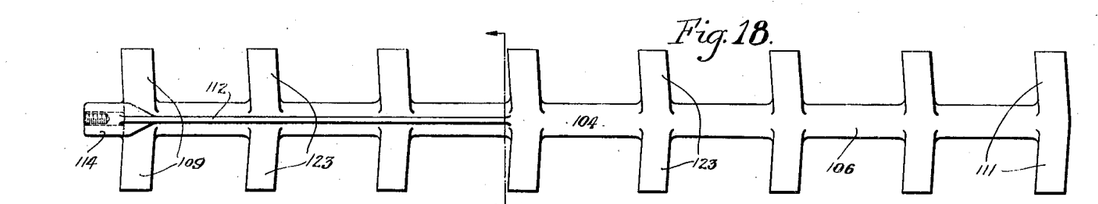
Figs. 18 to 23, inclusive, are similar views of another modification.

Figs. 12 to 17 illustrate another embodiment of my invention, wherein a conveyer 89 comprises a main drag part 91 and an auxiliary drag part 92. The main drag part 91 is similar in many respects to the part 69 of Fig. 6, but a central drag bar 93 thereof is provided with a tapered portion 94 which extends forwardly from a rear pair of pushers 95. As shown in Fig. 13, an upper edge 96 of the tapered drag bar 94 merges into beveled rear sides 97 of the pusher arms.

The conveyer part 92 is distinguishable over the corresponding part of Fig. 9, inasmuch as the central triangular drag bar 93 thereof is provided with oppositely tapered front and rear portions 98 and 99 which respectively extend to a free end 101 and to a tongue 102. For a further discussion of the construction and operation of this modification, reference is made to the preceding figures.

Figs. 18 to 23 illustrate a further embodiment of my invention, wherein a conveyer 103 comprises a main part 104 and an auxiliary part 105. The main part 104 comprises a central drag bar 106 which is of triangular cross-section. As shown, in Fig. 19, the bar 106 comprises oppositely tapered front and rear portions 107 and 108 which respectively extend to front and rear pairs of arms 109 and 111. The front tapered portion 107 may be reinforced by means of a rib 112 which starts at a central portion 113 of the bar 106 and gradually increases in dimension until it merges into a front head portion 114. The head portion 114 is adapted to be secured to a pusher rod (not shown) and it is also adapted to receive pivotally a tongue 115 of the auxiliary part 105.

Figure 19:
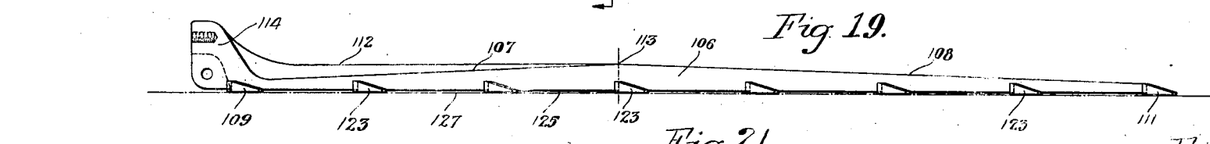
Figure 20:
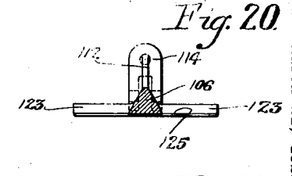
Figure 21:
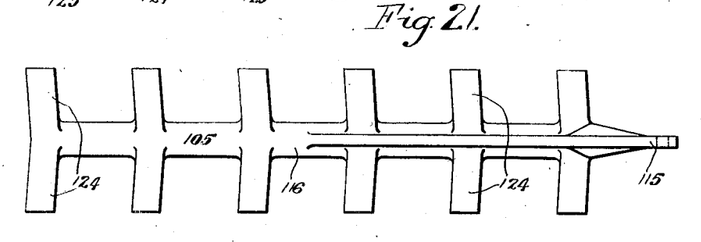
Figure 22:
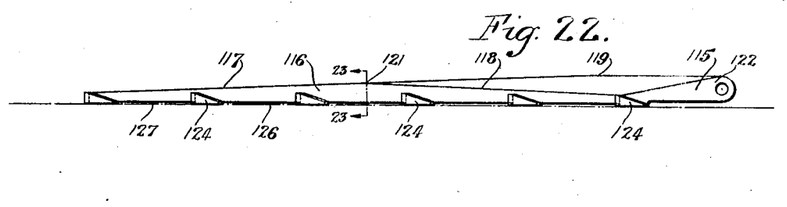
Figure 23:
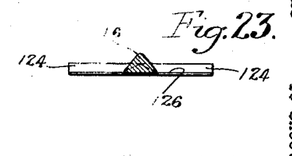

The auxiliary part 105 similarly comprises a central supporting bar 116 of triangular cross-section, comprising oppositely tapered front and rear sections 117 and 118. The section 118 is further reinforced by means of a rib 119 which extends from a central portion 121 of the bar 116 to a rear locking portion 122 of the tongue 115. The conveyer parts 104 and 105 are provided with pairs of arms 123 and 124, respectively, which extend from the central supporting bars 106 and 116 in the same manner as the pairs of arms of Fig. 1. As shown in Figs. 19 and 22, the arms 123 and 124 are extended below undersides 125 and 126 of the bars 106 and 116, respectively, so that the same may be supported in spaced relation to a floor surface 127. The further construction and operation of this conveyer is substantially the same as that set forth for the preceding figures.

Figure 24:
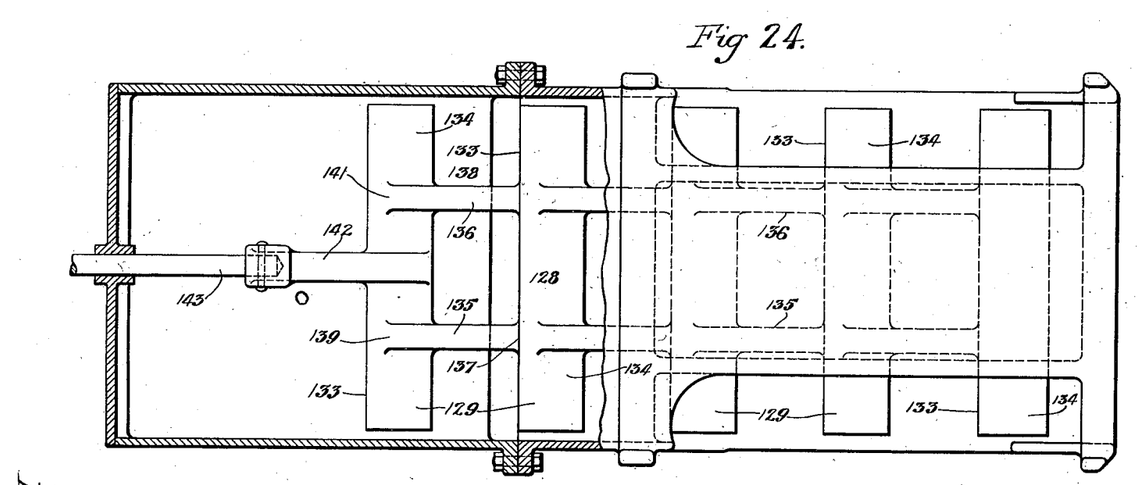
Figs. 24 and 25 are top plan and side elevational views, respectively, of still another form of embodiment of my invention showing the housing thereof in section.
Figure 25:
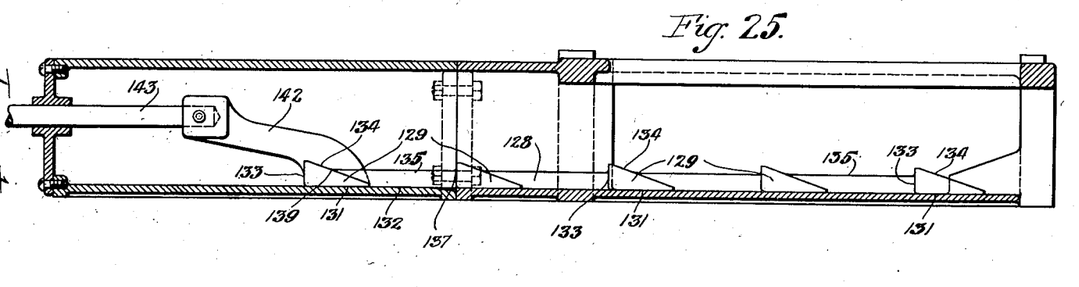
Figure 26:
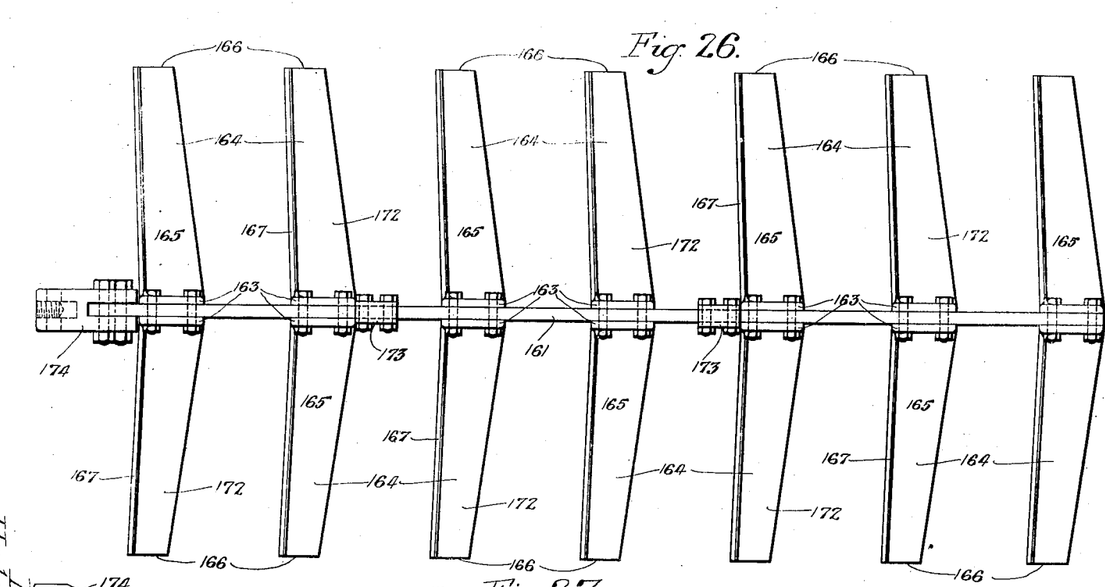
Figs. 26, 27 and 28 are top, side and end views, respectively, of the auxiliary part of a still further embodiment of my invention.
Figures 27, 28:
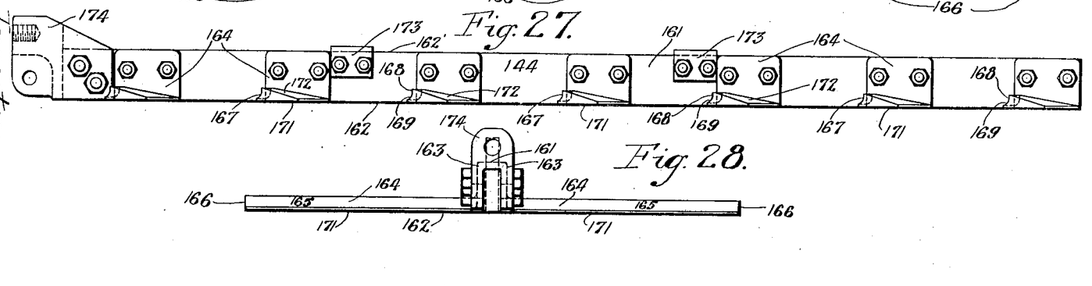
Figure 29:
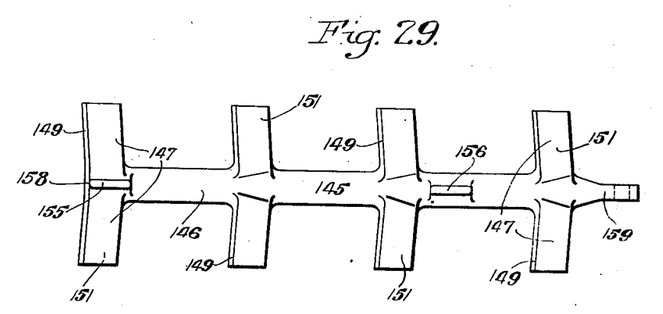
Figs. 29, 30 and 31 are similar views, but showing a still further form of main drag adapted for use with the auxiliary drag of Figs. 26 to 28, inclusive.
Figure 30:
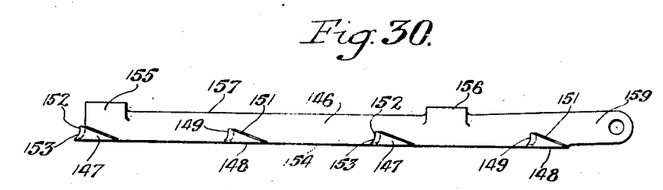
Figure 31:
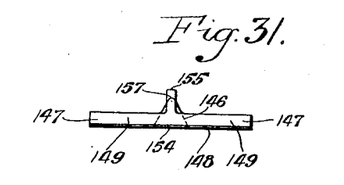

Figs. 24 and 25 illustrate a still further embodiment of my invention, wherein a conveyer part 128 is provided with a plurality of relatively large scraper arms 129 of wedge-like cross-section. Each arm comprises a flat bottom side 131, which is adapted to engage a floor surface 132, a front pusher side 133, and a rear beveled side 134. Each pair of transverse arms is interconnected by spaced, longitudinally extending ribs 135 and 136. The ribs extend from spaced points 137 and 138 on the front side 133 intermediate the ends of the cross arm to spaced points 139 and 141 on the rear side 134 of the next adjacent cross arm. In this manner, successive cross arms are interconnected by the pair of spaced longitudinally extending ribs, each pair of ribs extending from a front side of one cross arm to the beveled side of the next adjacent cross arm. The cross arm at one end of the conveyer part 128 is provided with an upwardly and forwardly extending tongue 142 which is adapted to engage a pusher rod 143. The arms 134 and interconnecting ribs 135 and 136 are preferably cast as a whole, though these parts may be removably secured together. The operation of the conveyer 128 is substantially the same as that set forth for Fig. 1.

Figs. 26 to 31, inclusive, show a still further form of conveyer embodying my invention. As therein disclosed, the conveyer comprises a main part 144 and an auxiliary part 145. The auxiliary part 145 corresponds in many respects to the main part of the conveyer of Fig. 1, and it comprises a central drag bar 146 of triangular cross-section and a plurality of angled cross arms 147 of wedge-like shape. The arms 147 comprise a base portion 148 and front and rear side portions 149 and 151, respectively. The rear side 151 is beveled, so that when a rearward movement occurs, the material to be conveyed may easily pass over the arms and move into the space immediately in front of the sides 149. The pusher sides 149 comprise angled portions 152 and 153, whereby a scoop-like effect may be exerted upon the material, causing such material as is on the floor surface 154 to be raised therefrom and also moved forwardly. An upward movement of the conveyer part 145 is further prevented by means of a pair of bosses 155 and 156 which extend upward from an edge 157 of the central drag bar 146. The boss 155 is positioned at a front end 158 of the drag bar 146, while the rear boss 156 is disposed adjacent to a rearwardly extending tongue 159.

The main conveyer part 144 comprises a central flat bar 161 which is mounted vertically on an edge 162 between base portions 163 of oppositely extending arms 164. The base portions 163 may be secured in position by bolts or other usual fastening means. Each arm is provided with an outwardly extending portion 165 from the base portion 163 of wedge-like cross-section, tapering in the direction of a free end 166. The portion 165 comprises a front side 167 which is slightly curved in such manner that, when the conveyer is moved on its working stroke, there is a tendency for the material to be drawn toward the center of the conveyer. As in Fig. 1, the front side 167 is provided with angled portions 168 and 169, whereby a scoop-like effect may be had tending to remove the material from the floor surface over which the conveyer is actuated. Each of the arm portions 165 is also provided with a bottom side 171 for engagement with the floor surface and a beveled rear side 172 over which the material may pass during the return stroke of the conveyer. The conveyer may be guided during its forward and return movements by a plurality of guiding members 173 which may be secured to an upper edge 162' of the central supporting strap member 161. A drag head 174 may be bolted or otherwise secured to one end of the central supporting member 161 and connected to a pusher rod (not shown).

Figures 32, 33:
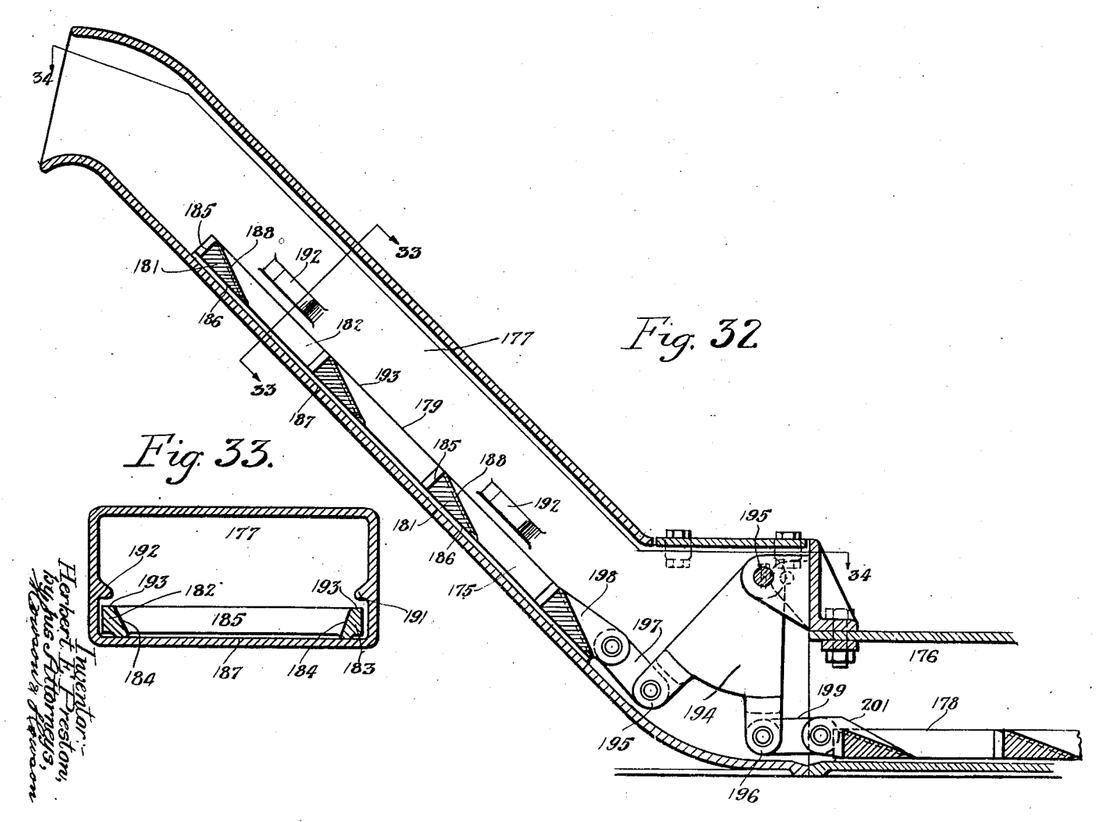
Fig. 32 is a vertical sectional view showing a still further form of conveyer applied to a chute having an inclined portion taken on the line 32—32 of Fig. 34.
Fig. 33 is a transverse sectional view taken on the line 33—33 of Fig. 32.
Figure 34:
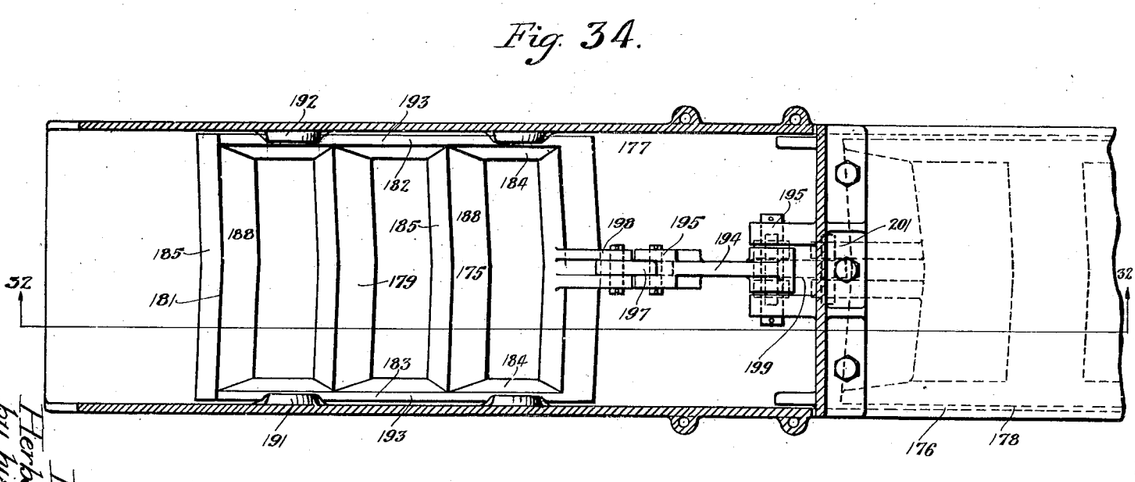
Fig. 34 is a sectional view taken on the line 34—34 of Fig. 32.

Figs. 32 to 34, inclusive, illustrate a still further embodiment of my invention, wherein a conveyer 175 is shown applied to a chute having a horizontal portion 176 and an inclined portion 177. The conveyer which is positioned therein, comprises a main part 178 and an auxiliary part 179. The main part 178 may be as disclosed in any of the preceding figures, while the auxiliary part 179 involves a plurality of cross arms 181 which are interconnected at the ends by a pair of longitudinally extending bars 182 and 183. A portion 184 of each bar, which is positioned between adjacent pairs of cross arms 181, is beveled as shown in Fig. 34. Each of the cross arms 181 has a front pusher side 185, a bottom side 186, which is adapted to engage one wall 187 of the inclined passage 177, and an inclined beveled side 188. A movement of the conveyer part 79 away from the bottom wall 187 is prevented by pairs of lugs 191 and 192. These lugs are disposed immediately adjacent to upper sides 193 of the longitudinally extending side bars 182 and 183 and engage the same when the conveyer 179 tends to lift upwardly away from the bottom side 187 of the passage 177.

The main and auxiliary parts 178 and 179 may be connected by means of a plate member 194 which is provided with angularly disposed arms 195 and 196. The arm 195 is connected by means of a link 197 to a head portion 198 of the upper conveyer part 179, while the arm 196 is similarly connected by means of a link 199 to a head portion 201 of the lower main conveyer part 178. The member 194 is pivotally mounted at 195, and it may be actuated by power means (not shown) in order to cause the desired reciprocation of the conveyer parts 178 and 179 and the consequent movement of material through the passage portions 176 and 177.

While I have shown a number of embodiments of my invention, for the purpose of describing the same and illustrating its principles of construction and operation, it is apparent that various changes and modifications may be made therein, without departing from the spirit of my invention and I desire, therefore, that only such limitations shall be imposed thereon, as are indicated in the appended claims or as are demanded by the prior art.

I claim:

1. A conveyer for effecting a progressive movement of ash or other loose material at a substantially predetermined rate from one point to a remote point of discharge consisting of a member extending substantially from one of said points to the other and having distributed at spaced points throughout its length transversely extending elements each having a forward material-engaging face formed at an angle to the direction of movement of the member relatively great as compared with the angle formed by a rearward material-engaging face, and means for longitudinally reciprocating said member.

2. A conveyer for effecting a progressive movement of ash or other loose material from one point to a remote point of discharge consisting of a material-supporting bed extending between said points, a member extending substantially from one of said points to the other and adapted for longitudinal reciprocation on said bed, said member having distributed at spaced points throughout its length transversely extending elements each having opposite faces respectively adapted to propel and to penetrate said material and each individually effective when said member is reciprocated to advance the material over the bed in one direction only, and means preventing elevation of said member from the bed.

3. A conveyer comprising a material-supporting bed, a member adapted for longitudinal reciprocation on said bed, said member having a plurality of transversely extending longitudinally spaced elements each having opposite faces respectively adapted to propel and to penetrate said material and each individually effective when the said member is reciprocated to advance the material over the bed in one direction only, and means for preventing elevation of said member from the bed.

4. A conveyer comprising a duct, a member adapted for longitudinal reciprocation in said duct, said member having a plurality of transversely extending elements spaced apart longitudinally of the member, and each of said elements having a forward material-advancing face and a rearward material-penetrating face, and means on said member engaging the top of said duct for preventing elevation of the member in the duct.

5. A conveyer comprising a material-supporting bed, a member adapted for longitudinal reciprocation on said bed and having a plurality of transversely extending elements spaced apart longitudinally of the member, each of said elements having a forward material-advancing face and a rearward material-penetrating face, and means for maintaining said elements in sliding contact with said bed.

6. A conveyer of the type set forth comprising an elongated element having upwardly converging side walls, and a plurality of transversely extending arms spaced apart longitudinally of the member, each of said arms having a forward material-advancing face and a rearward material-penetrating face.

7. A conveyer comprising a longitudinally reciprocatory member having a plurality of transversely extending elements spaced apart longitudinally of the member, each of said elements having a forward material-advancing face and a rearward material-penetrating face, said elements extending from said member in directions forming with the latter an obtuse angle between said member and the said rearward faces of the elements.

8. A conveyer comprising a longitudinally reciprocatory member having a plurality of transversely extending elements spaced apart longitudinally of the member, each of said elements having a forward material-advancing face and a rearward material-penetrating face, said elements extending from said member in directions forming with the latter an obtuse angle between said member and the said rearward faces of the elements, and an acute angle between the said forward faces of said elements and said member.

HERBERT E. PRESTON.